June 13, 1939.  T. SCHULZE  2,162,033
COFFEE BREWER
Filed June 8, 1937
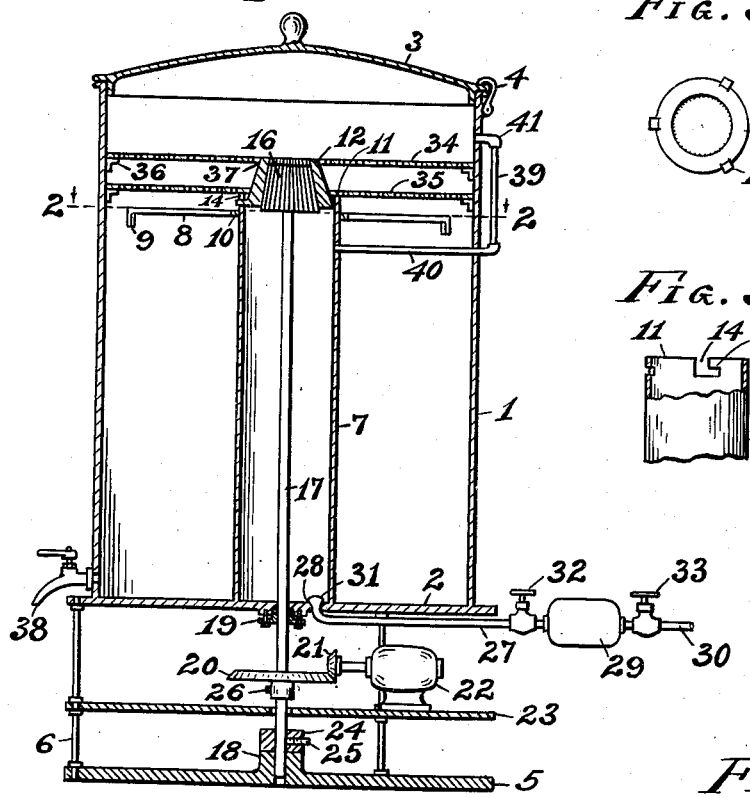
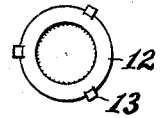
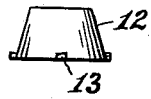
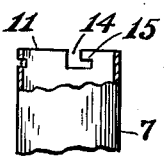
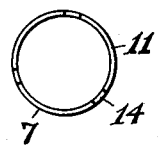
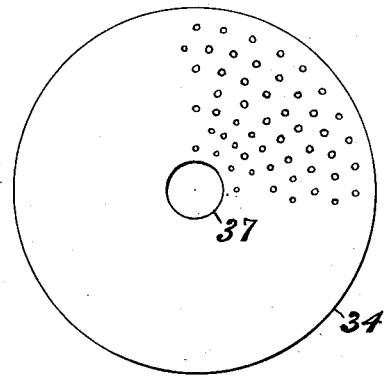
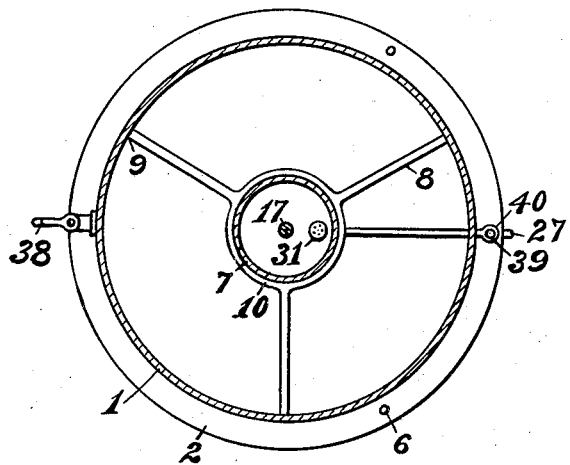
Inventor
Theodore Schulze
By G. E. Dunstan,
his Attorney Patented June 13, 1939

2,162,033

UNITED STATES PATENT OFFICE 2,162,033

COFFEE BREWER

Theodore Schulze, Cleveland, Ohio

Application June 8, 1937, Serial No. 146,991

4 Claims. (Cl. 53—3)

This invention relates to coffee brewers and more especially to coffee brewers in which the coffee beans are ground and brewed.

The main object of the invention is to provide a coffee brewer, in which the coffee beans are ground under water and the ground coffee beans brewed in the same water for preventing loss of the volatile elements thereof and thereby retaining the full strength and flavor of the coffee brewed.

Another object of the invention is to provide a coffee brewer of the above character, which is of simple and practical construction consisting of a unit convenient to use and readily put into operation.

With the above and other objects in view, the invention will be hereinafter fully described with reference to the accompanying drawing, and the novel features thereof will be particularly pointed out in the appended claims.

In the drawing, Figure 1 is a sectional elevation of a coffee brewer constructed in accordance with my invention, Fig. 2 is a cross-sectional view taken on line 2—2 of Fig. 1, Fig. 3 is a plan view of the ring-grinding member, Fig. 4 is an elevation thereof, Fig. 5 is an elevation of the upper portion of the tubular chamber for receiving the coffee beans, Fig. 6 is a plan view thereof, and Fig. 7 is a plan view of one of the strainers.

Referring to the drawing, 1 represents a cylindrical casing having a closed bottom 2 and a removable cover 3. The cover is held closed by means of suitable clamps as 4. The casing 1 is supported by and above a base 5 by means of a plurality of legs 6. Fixed to the bottom 2 of the casing and central thereof is a tubular chamber 7 adapted to receive the coffee beans. The chamber 7 is supported at its upper end from the sides of the casing 1 by means of a plurality of radial arms 8 fixed thereto at 9 and carrying a collar 10 encircling said tubular chamber below its upper edge 11.

Arranged within the upper end of the tubular chamber 7 and projecting thereabove is a ring-grinding member 12 of a mill. The ring-grinding member 12 is removably fixed to the upper end of the tubular chamber 7 by means of suitably tapering lugs indicated by 13, which are adapted to pass first through vertical slots 14 of said tubular chamber and by giving said member a clock-wise rotary turn locking said lugs in horizontal slots 15 of said tubular chamber. Cooperating with the grinding member 12 is a grinding head 16, which is fixed to an upright shaft 17, which passes through the bottom 2 of the casing and into a bearing 18 of the base 5. A suitable packing means 19 is provided for preventing leakage around the shaft 17.

For driving the shaft 17, a gear 20 is fixed thereto, and a pinion 21 of a motor 22 is in mesh therewith. A platform 23 carried by the legs 6 supports the motor 22. In order to permit adjustment of the grinding head 16 of the mill vertically for satisfactory grinding, the shaft 17 is slidably mounted in an adjustably supported collar 24, which rests upon the top of the bearing 18 and may be fixed thereto at any desired position by means of a set-screw 25. The gear 20 is also adjustably fixed to the shaft 17 by a set-screw 26.

Hot water is supplied to the brewer by means of a pipe 27 arranged below the bottom 2 of the casing and leading into the bottom of the tubular chamber 7 at 28. The pipe 27 is connected to an electric heater 29, which is connected by a pipe 30 to the city water supply. A strainer 31 is provided at the inlet end of the pipe 27, and shut-off valves 32 and 33 at each side of the heater 29. The incoming hot water forces the coffee beans upwardly and into the mill to be ground.

For straining the water from the ground coffee beans upon leaving the mill, suitable strainers 34 and 35 are provided. Said strainers are of the same diameter as the inside of the casing, are supported upon brackets indicated by 36 and fixed to the casing, and are provided with central openings as 37 for fitting over or receiving the ring-grinding member 12. A suitable faucet 38 is provided for drawing off the completed brewed coffee. A gauge-glass 39 connecting a pipe 40 to the chamber 7 and a nipple 41 in the casing is adapted to show the height of the hot water in the casing.

In practice, the coffee beans are placed in the chamber 7 after removing the ring-grinding member 12 by first turning same counter-clockwise and lifting same out. Said ring-grinding member is replaced, also the strainers 34 and 35, and the cover 3 applied. The electric heater 29 is put into operation and the shut-off valves 32 and 33 turned on. The incoming hot water through the strainer 31 carries the coffee beans up to the mill to be ground, and the water in which the coffee beans were ground and brewed passes downwardly through the strainers 34 and

35 into the casing ready to be drawn off at the faucet 38.

Having fully described my invention, what I claim is:

1. In a coffee brewer, the combination of a casing, the casing having a bottom, a chamber having one end closed by said bottom, the chamber having an opening communicating with said casing, means for admitting water under pressure to said closed end of the chamber, a mill, the mill being located in the opening of the chamber into the casing, and said mill being removable to permit the depositing of coffee beans in said chamber.

2. In a coffee brewer, the combination of a casing, a vertical chamber within the casing, the chamber having a closed lower end and an upper open end, a mill, the mill being removably fixed in the open end of said chamber, means for admitting water under pressure to the lower end of the chamber adapted to carry coffee beans therein to said mill, and means for driving said mill.

3. In a coffee brewer, the combination of a casing, a vertical chamber in the casing, the chamber having a closed lower end and an upper open end, a mill in said open end of said chamber, means for admitting water under pressure to the lower end of said chamber, means for driving said mill, and means for straining the ground coffee beans and water after leaving the mill and before entering the casing.

4. In a coffee brewer, the combination of a casing, a vertical tube in the casing, the tube having a closed lower end and an open upper end, a mill, the mill being located in the open upper end of said tube, and a pipe leading through the closed lower end of the tube for admitting water thereto under pressure.

THEODORE SCHULZE.